United States Patent
Ehrenberg et al.

(10) Patent No.: US 6,358,287 B1
(45) Date of Patent: Mar. 19, 2002

(54) MIXTURES OF FIBER-REACTIVE DYES, PREPARATION THEREOF AND USE THEREOF FOR DYEING FIBER MATERIALS

(75) Inventors: Stefan Ehrenberg, Frankfurt am Main; Christian Schumacher, Kelkheim, both of (DE)

(73) Assignee: DyStar Textilfarben GmbH & Co., Deutschland KG (DE)

( * ) Notice: Subject to any disclaimer, the term of this patent is extended or adjusted under 35 U.S.C. 154(b) by 0 days.

(21) Appl. No.: 09/543,234

(22) Filed: Apr. 6, 2000

(30) Foreign Application Priority Data

Apr. 8, 1999 (DE) .......................... 199 15 802

(51) Int. Cl.$^7$ .......................... D06P 1/38; D06P 1/384; C09B 67/24
(52) U.S. Cl. .......................... 8/549; 8/641; 8/918; 8/924
(58) Field of Search .......................... 8/549, 641, 918, 8/924

(56) References Cited

U.S. PATENT DOCUMENTS

| 4,577,015 A | 3/1986 | Jäger et al. |
|---|---|---|
| 5,484,459 A | 1/1996 | Helmling |
| 4,774,333 A | 9/1998 | Springer et al. |
| 6,190,423 B1 * | 2/2001 | Schumacher et al. |

FOREIGN PATENT DOCUMENTS

| DE | 1215282 | 4/1966 |
|---|---|---|
| EP | 258493 | of 1988 |
| EP | 153599 | 2/1988 |

* cited by examiner

*Primary Examiner*—Margaret Einsmann
(74) *Attorney, Agent, or Firm*—Connolly Bove Lodge & Hultz LLP

(57) ABSTRACT

Mixtures of fiber-reactive dyes, preparation thereof and use thereof for dyeing fiber materials The present invention relates to dye mixtures comprising one or more dyes of the general formula (I)

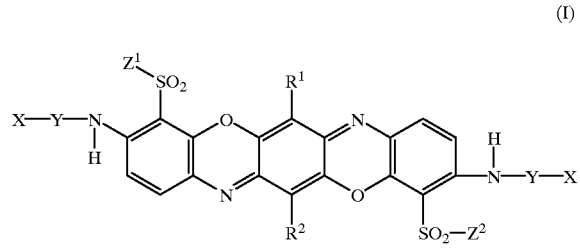

(I)

and one or more dyes of the general formula (II)

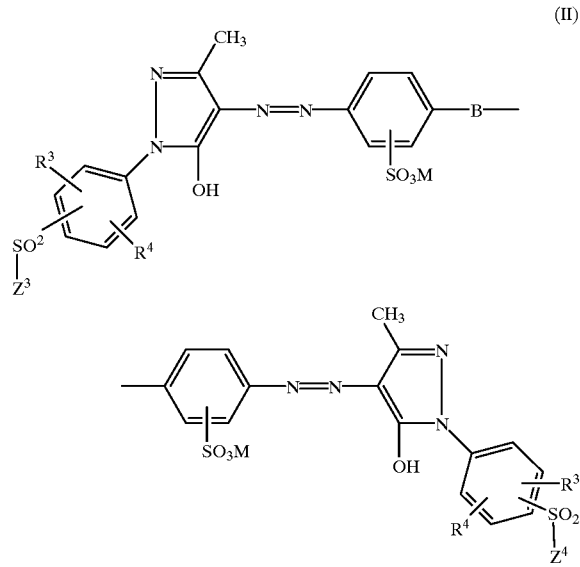

(II)

where B, M, $R^1$, $R^2$, $R^3$, $R^4$, X, Y, $Z^1$, $Z^2$, $Z^3$ and $Z^4$ are each as defined in claim 1, processes for their preparation, and their use for dyeing or printing hydroxyl- and/or carboxamido-containing material.

14 Claims, No Drawings

MIXTURES OF FIBER-REACTIVE DYES, PREPARATION THEREOF AND USE THEREOF FOR DYEING FIBER MATERIALS

The present invention relates to the technical field of fiber-reactive dyes. To obtain green reactive dyeings, it is necessary to use either green reactive phthalocyanine dyes or mixtures of blue with yellow reactive dyes. Mixtures of yellow reactive dyes with navy azo dyes are relatively dull and have poor lightfastnesses. Mixtures of yellow reactive dyes with reactive phthalocyanines are brilliant, but have poor washfastnesses. In addition, mixtures with yellow reactive dyes are frequently photochromic.

Unfortunately, it is especially the strong, brilliant reactive triphendioxazine dyes which are difficult to combine with other dyes because of pronounced blocking effects. This problem is described in U.S. Pat. No. 5,484,459.

It is an object of the present invention to provide mixtures of yellow reactive dyes with triphendioxazines in the green hue region without the abovementioned disadvantages.

It has now been found that, surprisingly, mixtures comprising the dyes of the general formulae (1) and (2) lead to excellent results.

The present invention accordingly provides dye mixtures comprising one or more dyes of the general formula (1)

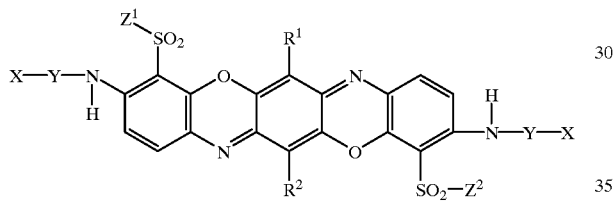

and one or more dyes of the general formula (2)

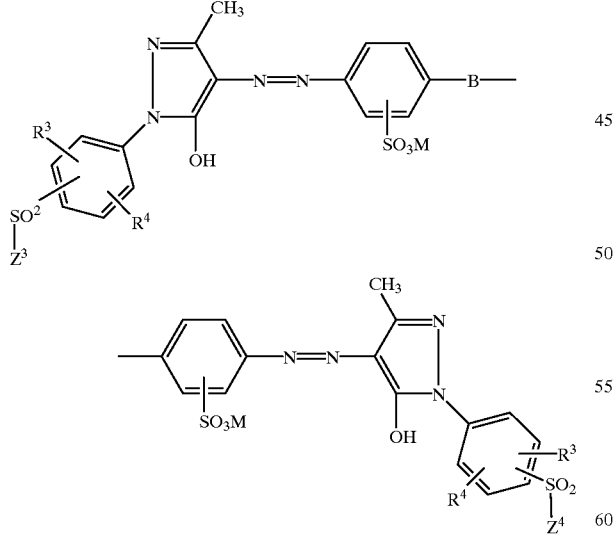

where:
$R^1$ is hydrogen or chlorine, preferably chlorine;
$R^2$ is hydrogen or chlorine, preferably chlorine;
$Z^1$ is OM or vinyl or is ethyl that is substituted in the Deposition by an alkali-eliminable substituent, as for example by chlorine, sulfato, thiosulfato, phosphate, alkanoyloxy of 2 to 5 carbon atoms, such as acetyloxy, or sulfobenzoyloxy, and is preferably vinyl, β-chloroethyl or β-sulfatoethyl, particularly preferably vinyl or β-sulfatoethyl;

$Z^2$ is OM, hydroxyethyl, vinyl or is ethyl that is substituted in the β-position by an alkali-eliminable substituent, as for example by chlorine, sulfato, thiosulfato, phosphate, alkanoyloxy of 2 to 5 carbon atoms, such as acetyloxy, or sulfobenzoyloxy, and is preferably vinyl, β-chloroethyl or β-sulfatoethyl, particularly preferably vinyl or β-sulfatoethyl;

$Z^3$ is vinyl or is ethyl that is substituted in the β-position by an alkali-eliminable substituent, as for example by chlorine, sulfato, thiosulfato, phosphate, alkanoyloxy of 2 to 5 carbon atoms, such as acetyloxy, or sulfobenzoyloxy, and is preferably vinyl, β-chloroethyl or β-sulfatoethyl, particularly preferably vinyl or β-sulfatoethyl;

$Z^4$ is hydroxyethyl, vinyl or is ethyl that is substituted in the β-position by an alkali-eliminable substituent, as for example by chlorine, sulfato, thiosulfato, phosphate, alkanoyloxy of 2 to 5 carbon atoms, such as acetyloxy, or sulfobenzoyloxy, and is preferably vinyl, β-chloroethyl or β-sulfatoethyl, particularly preferably vinyl or β-sulfatoethyl;

Y is a straight-chain or branched alkylene radical of 2 to 6 carbon atoms which may be interrupted by 1 or 2 hetero groups from the group consisting of —NH—, —O— and —$SO_2$—;

X is W or —NR*CO—V—COOM and if $Z^1$ and $Z^2$=OM is a radical of the formula (1a)

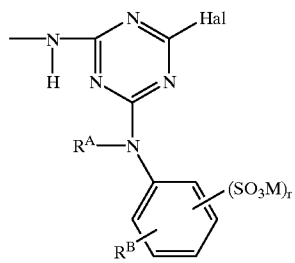

where
Hal is chlorine or fluorine;
r is 1 or 2;
$R^A$ is hydrogen, alkyl of 1 to 4 carbon atoms, such as ethyl or especially methyl, hydroxyethyl or sulfoethyl;
$R^B$ is hydrogen, methoxy, ethoxy, methyl or ethyl;
W is sulfato, sulfo or carboxyl;
R* is hydrogen or an alkyl group of 1 to 4 carbon atoms;
V is —(CH2)n where n=1 to 4;
$R^3$ is hydrogen, alkyl of 1 to 4 carbon atoms, such as ethyl or especially methyl, alkoxy of 1 to 4 carbon atoms, such as ethoxy or especially methoxy, sulfo or carboxyl, preferably hydrogen, methyl or methoxy, particularly preferably hydrogen;
$R^4$ is hydrogen, alkyl of 1 to 4 carbon atoms, such as ethyl or especially methyl, alkoxy of 1 to 4 carbon atoms, such as ethoxy or especially methoxy, sulfo or carboxyl, preferably hydrogen, methyl or methoxy, particularly preferably hydrogen;

B is a direct bond or alkylene of 1–3 carbon atoms;

M is hydrogen, an alkali metal, such as sodium, potassium or lithium, or the equivalent of an alkaline earth metal, as of calcium, preferably hydrogen or especially sodium, potassium or lithium.

In the above general formulae and also in the subsequent general formulae, the individual constituents of the formulae, whether they bear identical or different designations, can have meanings under their definition which are mutually identical or different.

The terms "sulfo", "thiosulfato", "carboxyl", "phosphate" and "sulfato" cover not only the acid form but also the salt form of the respective groups. Accordingly, sulfo groups are groups conforming to the general formula —$SO_3M$, thiosulfato groups are groups conforming to the general formula —S—$SO_3M$, carboxyl groups are groups conforming to the general formula —COOM, phosphato groups are groups conforming to the general formula —$OPO_3M_2$ and sulfato groups are groups conforming to the general formula —$OSO_3M$, where each M is as defined above. Groups of the general formulae (3a) and (3b)

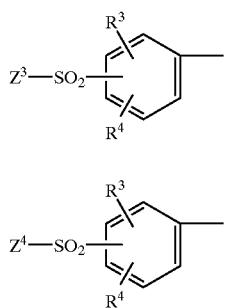

present in the dyes (2) are for example 3-(β-sulfatoethylsulfonyl)-phenyl, 4-(β-sulfatoethylsulfonyl)-phenyl, 2-methyl-5-(β-sulfatoethylsulfonyl)-phenyl, 2-methoxy-5-(β-sulfatoethyl-sulfonyl)-phenyl, 4-methyl-3-(β-sulfatoethylsulfonyl)-phenyl, 2,5-dimethyl-4-(β-sulfatoethylsulfonyl)-phenyl, 2,6-dimethyl-4-(β-sulfatoethylsulfonyl)-phenyl, 2-methoxy-4-(β-sulfatoethylsulfonyl)-phenyl, 4-methoxy-5-(β-sulfatoethylsulfonyl)-phenyl, 2-methoxy-5-methyl4-(β-sulfatoethylsulfonyl)-phenyl, 2,4-dimethoxy-5-(β-sulfatoethylsulfonyl)-phenyl, 2,5-dimethoxy4-(β-sulfatoethylsulfonyl)-phenyl, 2-carboxy-5-(β-sulfatoethylsulfonyl)-phenyl, 2-sulfo-5-(β-sulfatoethylsulfonyl)-phenyl and 2-sulfo4-(β-sulfatoethyl-sulfonyl)-phenyl, of which in particular 3- or 4-(β-sulfatoethylsulfonyl)-phenyl, and also their derivatives in which the β-sulfatoethylsulfonyl group is replaced by a vinylsulfonyl or β-thiosulfatoethylsulfonyl or β-chloroethylsulfonyl group. The groups $Z^3$—$SO_2$— and $Z^4$—$SO_2$ are preferably disposed meta or para relative to the pyrazole radical Of the dye mixtures of the invention, preference is given to those with dyes (1) where $R^1$ and $R^2$ are each chlorine, Y is ethyl, W is sulfato, $NHCOCH_2CH_2COOH$, and $Z^1$ and $Z^2$ are each β-sulfatoethyl.

Of the dye mixtures of the invention, preference is likewise given to those with dyes (2) where B is a direct bond, $SO_2$—$Z^3$ or $SO_2$—$Z^4$ is 4-(β-sulfatoethylsulfonyl) and the sulfo group is disposed ortho or meta relative to the diazo group. The dyes of the general formula (1) may, especially if the chromophore is the same, possess different fiber-reactive groups —$SO_2$—$Z^1$ and —$SO_2$—$Z^4$ (the same applies to the dyes of the general formula (2) with regard to —$SO_2$—$Z^3$ and —$SO_2$—$Z^4$). More particularly, the dye mixtures may include dyes of the same choromphore conforming to the discussed general formulae where the fiber-reactive groups —$SO_2$—$Z^1$, —$SO_2$—$Z^2$, —$SO_2$—$Z^3$ and —$SO_2$—$Z^4$ are, on the one hand, vinylsulfonyl groups and, on the other, β-chloroethylsulfonyl or β-thiosulfatoethylsulfonyl or preferably β-sulfatoethylsulfonyl groups.

In dye mixtures according to the invention, the ratios of the dye or dyes (1) and the dye or dyes (2) are preferably 98:2 to 10:90% by weight, particularly preferably 70:30% by weight to 30:70% by weight, most preferably 60:40 to 40:60% by weight. Dye mixtures according to the invention can be prepared by mixing the individual dyes.

Hereinbelow the dyes of the general formula (1) may be referred to globally as "dyes (1)" and the dyes (2) as "dyes (2)". They are known from DE-A 1215282, EP-A 0153599 and EP-B 258493 and can be prepared similarly to the directions provided therein.

Blocking effects are determined by using a mixture according to the invention to dye the material to be dyed. In further identical dyeing processes, one or more dyes of the general formula (1) according to the invention are applied first and this dyed material is then overdyed with one or more dyes of the general formula (2) according to the invention in a renewed identical dyeing process. Another identical dyeing process is then used to prepare a dyeing using initially one or more dyes of the general formula (2) according to the invention, which, however, have to be identical to the previously used dyes according to the invention, and thereafter one or more dyes of the general formula (1) are applied in a further identical dyeing process to the material to be dyed. When all three hereinabove described dyeings have the same shade, then the dyes tested do not produce a blocking effect.

Dye mixtures according to the invention are notable for good compatibility. They do not exhibit any blocking effects, which is advantageous for the levelness and economics of the dyeings. Furthermore, dyeings according to the invention are not photochromic.

The dye mixtures of the invention can be present as a preparation in solid or in liquid (dissolved) form. In solid form, they generally include the electrolyte salts customary for water-soluble and especially for fiber-reactive dyes, such as sodium chloride, potassium chloride and sodium sulfate, and may further comprise the auxiliaries customary in commercial dyes, such as buffer substances capable of setting a pH in aqueous solution between 3 and 7, such as sodium carbonate, sodium citrate, sodium borate, sodium bicarbonate, sodium dihydrogenphosphate and disodium hydrogenphosphate, dyeing auxiliaries, dustproofing agents and small amounts of siccatives; if they are present in a liquid, aqueous solution (including the presence of thickeners of the type customary in print pastes), they may also include substances which ensure a long life for these preparations, for example mold preventatives.

In solid form, the dye mixtures of the invention are generally present as pulverulent or granular preparations which include an electrolyte salt with or without one or more of the abovementioned auxiliaries. The dye mixture fraction in the preparations ranges from 10 to 80% by weight, based on the preparation. The buffer substances are generally present in a total amount of up to 5% by weight, based on the preparation. If the dye mixtures of the invention are present in aqueous solution, the total dye content of these aqueous solutions will be up to about 50% by weight, for example between 5 and 50% by weight, and the electrolyte salt content of these aqueous solutions will preferably be below 10% by weight, based on the aqueous solution; the aqueous solutions (liquid preparations) may include the aforementioned buffer substances in an amount which is generally up to 5% by weight, preferably up to 2% by weight.

The separation from their synthesis solution of the chemically prepared dye mixtures of the invention can be effected according to generally known methods, for example either by precipitating from the reaction medium by means of electrolytes, for example sodium chloride or potassium chloride, or by evaporating or spray-drying the reaction solution, in which case this reaction solution may have a buffer substance added to it.

Dye mixtures according to the invention may include further fiber-reactive dyes which are used for shading the dye mixture, in an amount of up to 5% by weight. These shading dyes may be added by customary mixing.

The dye mixtures of the invention have useful application properties. They are used for dyeing or printing hydroxyl- and/or carboxamido-containing materials, for example in the form of sheetlike structures, such as paper and leather or of films, for example composed of polyamide, or in bulk, as for example of polyamide and polyurethane, but especially for dyeing or printing these materials in fiber form. Similarly, the as-synthesized solutions of the azo compounds after their admixture to form dye mixtures according to the invention, if appropriate after or with addition of a buffer substance, and also if appropriate after concentrating or diluting, can be used directly as liquid preparation for dyeing.

The present invention thus also relates to the use of the dye mixtures of the invention for dyeing or printing these materials, or rather to processes for dyeing or printing these materials in a conventional manner, by using a dye mixture of the invention as colorant. The materials are preferably employed in the form of fiber materials, especially in the form of textile fibers, such as woven fabrics or yarns, as in the form of hanks or wound packages.

Hydroxyl-containing materials are those of natural or synthetic origin, for example cellulose fiber materials or their regenerated products and polyvinyl alcohols. Cellulose fiber materials are preferably cotton, but also other vegetable fibers, such as linen, hemp, jute and ramie fibers; regenerated cellulose fibers are for example staple viscose and filament viscose.

Carboxamido-containing materials are for example synthetic and natural polyamides and polyurethanes, especially in the form of fibers, for example wool and other animal hairs, silk, leather, nylon-6,6, nylon-6, nylon-11 and nylon-4.

The dye mixtures of the invention can be applied to and fixed on the substrates mentioned, especially the fiber materials mentioned, by the application techniques known for water-soluble dyes, especially fiber-reactive dyes.

For instance, on cellulose fibers they produce by the exhaust method, using various acid-binding agents, and optionally neutral salts, such as sodium chloride or sodium sulfate, dyeings having very good color yields which are improved compared with the individual dyes. Application is preferably from an aqueous bath at temperatures between 40 and 105° C., optionally at a temperature of up to 130° C. under superatmospheric pressure, and optionally in the presence of customary dyeing auxiliaries. One possible procedure is to introduce the material into the warm bath and to gradually heat the bath to the desired dyeing temperature and to complete the dyeing process at that temperature. The neutral salts which accelerate the exhaustion of the dyes may also, if desired, only be added to the bath after the actual dyeing temperature has been reached.

The padding process likewise provides excellent color yields and very good color build-up on cellulose fibers, the dyes being allowed to become fixed on the material by batching at room temperature or at elevated temperature, for example at up to 60° C., for example by steaming or using dry heat in a conventional manner.

Similarly, the customary printing processes for cellulose fibers, which can be carried out either single-phase, for example by printing with a print paste comprising sodium bicarbonate or some other acid-binding agent and by subsequent steaming at 100 to 103° C., or two-phase, for example by printing with a neutral or weakly acidic print paste and subsequent fixation either by passing the printed material through a hot electrolyte-comprising alkaline bath or by overpadding with an alkaline electrolyte-comprising padding liquor with subsequent batching or steaming or dog heat treatment of the alkali—overpadded, produce strong prints with well-defined contours and a clear white ground. The appearance of the prints is not greatly affected by variations in the fixing conditions.

When fixing by means of dry heat in accordance with the customary thermofix processes, hot air from 120 to 200° C. is used. In addition to the customary steam at 101 to 103° C. it is also possible to use superheated steam and high-pressure steam at temperatures of up to 160° C.

The acid-binding agents which effect the fixation of the dyes of the dye mixtures of the invention on the cellulose fibers include for example water-soluble basic salts of the alkali metals and likewise alkaline earth metals of inorganic or organic acids or compounds which liberate alkali in the heat. Especially suitable are the alkali metal hydroxides and alkali metal salts of weak to medium inorganic or organic acids, the preferred alkali metal compounds being the sodium and potassium compounds. Such acid-binding agents include for example sodium hydroxide, potassium hydroxide, sodium carbonate, sodium bicarbonate, potassium carbonate, sodium formate, sodium dihydrogenphosphate, disodium hydrogenphosphate, sodium trichloroacetate, waterglass or trisodium phosphate.

The dye mixtures of the invention are notable for a high yield of fixation when applied to the cellulose fiber materials by dyeing or printing. The cellulose dyeings obtained following the customary aftertreatment by rinsing to remove unfixed dye portions exhibit excellent wetfastnesses, in particular since such unfixed dye portions are easily washed off on account of their good solubility in cold water.

The dyeings and prints obtainable with the dye mixtures of the invention have bright hues; especially the dyeings and prints on cellulose fiber materials have good lightfastness and especially very good wetfastnesses, such as wash, milling, water, seawater, crossdyeing and acidic and also alkaline perspiration fastness properties, also good fastness to pleating, hotpressing and rubbing.

Furthermore, the dye mixtures of the invention can also be used for the fiber-reactive dyeing of wool. Moreover, wool which has been given a nonfelting or low-felting finish (cf. for example H. Rath, Lehrbuch der Textilchemie, Springer-Verlag, 3rd Edition (1972), p. 295–299, especially the finish by the Hercosett process (p. 298); J. Soc. Dyers and Colourists 1972, 93–99, and 1975, 33–44) can be dyed with very good fastness properties.

The process of dyeing on wool is here carried out in a conventional manner from an acidic medium. For instance, acetic acid and/or ammonium sulfate or acetic acid and ammonium acetate or sodium acetate may be added to the dyebath to obtain the desired pH. To obtain a dyeing of acceptable levelness, it is advisable to add a customary leveling agent, for example on the basis of a reaction product of cyanuric chloride with three times the molar amount of an aminobenzenesulfonic acid and/or of an aminonaphthalenesulfonic acid or on the basis of a reaction product of for example stearylamine with ethylene oxide. For instance, the dye mixture of the invention is preferably subjected to the exhaust process initially from an acidic dyebath having a pH of about 3.5 to 5.5 under pH control and the pH is then, toward the end of the dyeing time, shifted into the neutral and optionally weakly alkaline range up to a pH of 8.5 to bring about, especially for very deep dyeings, the full reactive bond between the dyes of the dye mixtures of the invention and the fiber. At the same time, the dye portion not reactively bound is removed.

The procedure described herein also applies to the production of dyeings on fiber materials composed of other natural polyamides or of synthetic polyamides and polyurethanes. In general, the material to be dyed is introduced into the bath at a temperature of about 40° C., agitated therein for some time, the dyebath is then adjusted to the desired weakly acidic, preferably weakly acetic acid, pH and the actual dyeing is carried out at a temperature between 60 and 98° C. However, the dyeings can also be carried out at the boil or in sealed dyeing apparatus at temperatures of up to 106° C. Since the water solubility of the dye mixtures of the invention is very good, they can also be used with advantage in customary continuous dyeing processes. The color strength of the dye mixtures of the invention is very high.

The dye mixtures of the invention dye the materials mentioned, preferably fiber materials, in bright yellowish green to greenish blue shades.

The examples hereinbelow serve to illustrate the invention. Parts and percentages are by weight, unless otherwise stated. Parts by weight relate to parts by volume as the kilogram relates to the liter. The compounds described in the examples in terms of a formula are indicated in the form of free acids; in general they are prepared and isolated in the form of their salts, preferably sodium or potassium salts, and used for dyeing in the form of their salts. The starting compounds mentioned in the following examples, especially table examples, can similarly be used in the synthesis in the form of the free acid or in the form of their salts, preferably alkali metal salts, such as sodium or potassium salts.

EXAMPLE 1

1000 parts of an aqueous solution containing 120 parts of the hereinbelow indicated dye of the formula (A), such as a synthesis solution of this dye, and 1000 parts of an aqueous solution containing 65 parts of the hereinbelow indicated dye of the formula (B), such as a synthesis solution of this dye

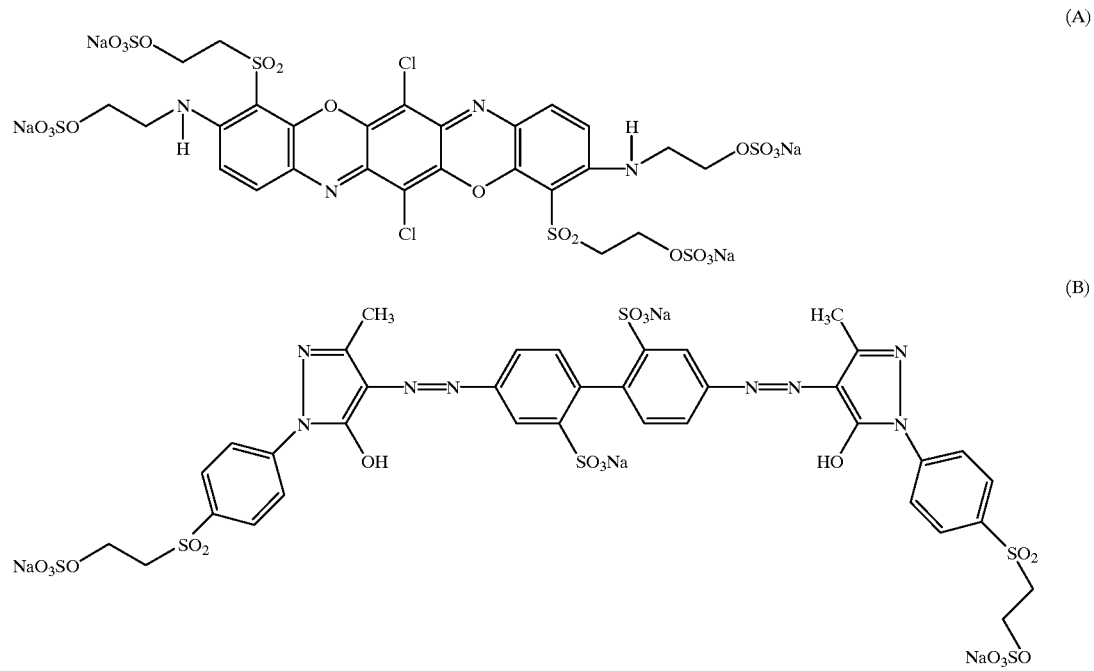

are mixed with one another,

The dye mixture of the invention is isolated from the combined solution in a conventional manner, for example by spray-drying the dye solution. The resultant dye mixture of the invention which contains electrolyte salts from the synthesis, such as sodium chloride and sodium sulfate, has very good dyeing properties and provides for example on cellulosic fiber materials, such as cotton, or regenerated cellulose fibers, strong brilliant green dyeings when applied by an exhaust dyeing process customary for fiber-reactive dyes without any blocking effect.

EXAMPLE 2

400 parts of an electrolyte-containing dye powder containing the blue reactor dye of the formula (C) in a fraction of 50% are mixed with 200 parts of an electrolyte-containing dye powder containing the yellow disazo dye of the formula (B) in a fraction of 45%,

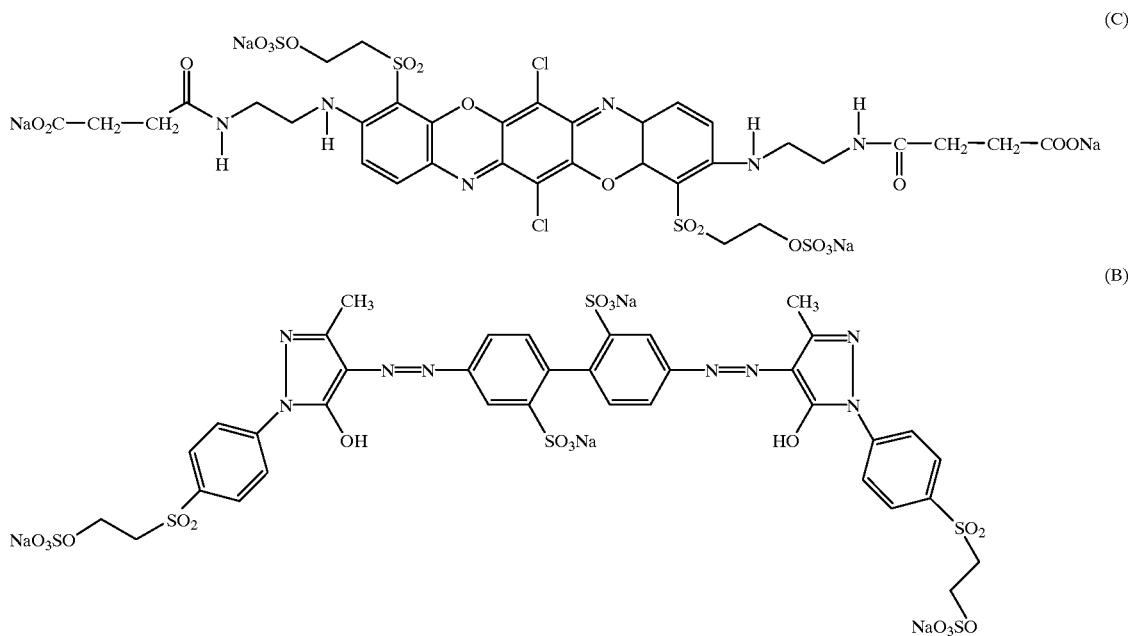

(C)

(B)

in a mechanical mixer. The resultant dye mixture according to the invention, when applied by the application and fixing methods customary in the art for fiber-reactive dyes, produces, on cellulose fibers for example, dyeings and prints in deep greenish blue shades.

EXAMPLE 3

500 parts of an electrolyte-containing dye powder containing the blue reactor dye of the formula (A) in a fraction of 50% are mixed with 500 parts of an electrolyte-containing dye powder containing the yellow disazo dye of the formula (D) in a fraction of 48%,

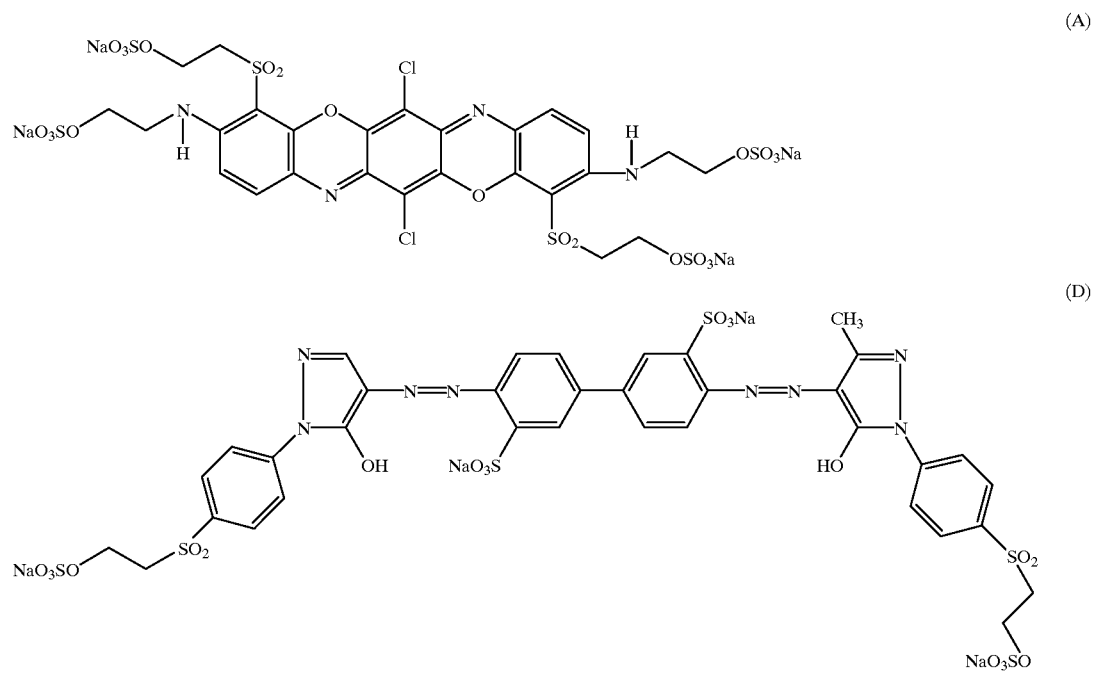

(A)

(D)

in a mechanical mixer. The resultant dye mixture according to the invention, when applied by the application and fixing methods customary in the art for fiber-reactive dyes, produces, on cellulose fibers for example, dyeings and prints in deep green shades.

EXAMPLE 4

250 parts of an electrolyte-containing dye powder containing the yellow disazo dye as in Example 1 of the formula (B) in a fraction of 45% are mixed with 100 parts of an electrolyte-containing dye powder containing the blue reactive dye of the formula (E) in a fraction of 40%,

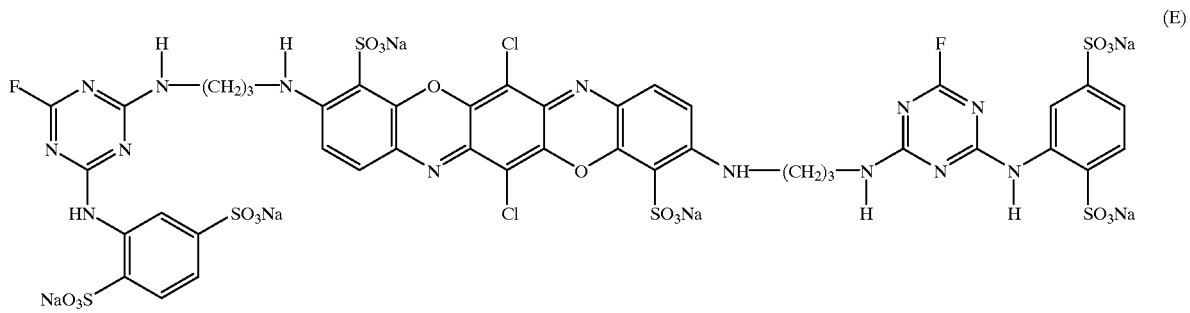

(E)

in a mechanical mixer. The resultant dye mixture according to the invention, when applied by the application and fixing methods customary in the art for fiber-reactive dyes, produces, on cellulose fibers for example, dyeings and prints in deep yellowish green shades.

EXAMPLES 5 to 10

The table examples hereinbelow describe further inventive dye mixtures comprising the dye of the formula (A) and the dye for the formula (B). These dye mixtures, when applied by the application and fixing methods customary in the art for fiber-reactive dyes, produce on the fiber materials mentioned in the description strong fast dyeings having the hue (on cotton in this case) reported in the respective table example.

| Ex. | Blend ratio (A):(B) in % by weight | Hue |
| --- | --- | --- |
| 5 | 60:40 | green |
| 6 | 30:70 | Yellowish green |
| 7 | 50:50 | green |
| 8 | 70:30 | greenish blue |
| 9 | 80:20 | greenish blue |
| 10 | 90:10 | greenish blue |

What is claimed is:

1. A dye mixture comprising one or more dyes of the general formula (1)

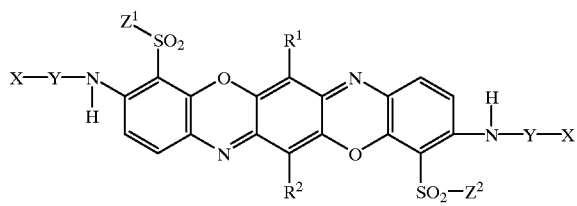

(1)

and one or more dyes of the general formula (2)

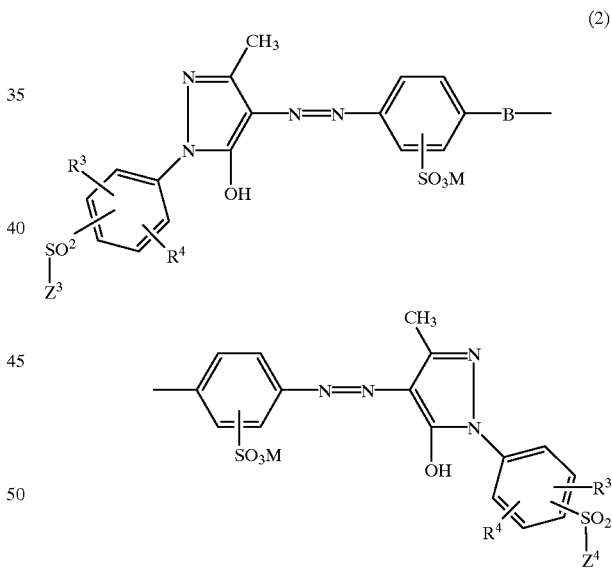

(2)

where:
  $R^1$ is hydrogen or chlorine;
  $R^2$ is hydrogen or chlorine;
  $Z^1$ is OM or vinyl or is ethyl that is substituted in the β-position by an alkali-eliminable substituent;
  $Z^2$ is OM, hydroxyethyl, vinyl or is ethyl that is substituted in the β-position by an alkali-eliminable substituent;
  $Z^3$ is vinyl or is ethyl that is substituted in the β-position by an alkali-eliminable substituent;
  $Z^4$ is hydroxyethyl, vinyl or is ethyl that is substituted in the β-position by an alkali-eliminable substituent;
  Y is a straight-chain or branched alkylene radical of 2 to 6 carbon atoms which may be interrupted by 1 or 2 hetero groups from the group consisting of —NH—, —O— and —SO$_2$—;

X is W or —NR*CO—V—COOM; when $Z^1$ and $Z^2$=OM then X then X has the meaning of formula (1a)

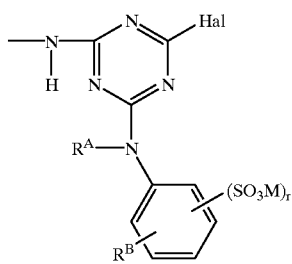

(1a)

where
Hal is chlorine or fluorine;
r is 1 or 2;

$R^A$ is hydrogen, alkyl of 1 to 4 carbon atoms, hyroxyethyl or sulfoethyl;
$R^B$ is hydrogen, methoxy, ethoxy, methyl or ethyl;
W is sulfato, sulfo or carboxyl;
R* is hydrogen or an alkyl group of 1 to 4 carbon atoms;
V is a direct bond or a straight—chain or branded alkylene group of 1 to 8 carbon atoms;
$R^3$ is hydrogen, alkyl of 1 to 4 carbon atoms, alkoxy of 1 to 4 carbon atoms, sulfo, carboxyl;
$R^4$ is hydrogen, alkyl of 1 to 4 carbon atoms, alkoxy of 1 to 4 carbon atoms, sulfo, carboxyl;
B is a direct bond or alkyl of 1 to 3 carbon atoms;
M is hydrogen, an alkali metal, or the equivalent of of an alkaline earth metal.

2. A dye mixture as claimed in claim 1, wherein $R^1$ and $R^2$ are both chlorine.

3. A dye mixture as claimed in claim 1, wherein $R^3$ and $R^4$ are both hydrogen.

4. A dye mixture as claimed in claim 1, wherein $Z^1$, $Z^2$, $Z^3$ and $Z^4$ are each identical or different and are β-sulfatoethyl or vinyl.

5. A dye mixture as claimed in claim 1, wherein Y is —CH$_2$CH$_2$—.

6. A dye mixture as claimed in claim 1, wherein X is —OSO$_3$H.

7. A dye mixture as claimed in claim 1, wherein X is —NHCOCH$_2$CH$_2$COOH.

8. A dye mixture as claimed in claim 1, wherein the dye or dyes of the general formula (1) and the dye or dyes of the general formula (2) are present in the blend ratio of 98:2 to 10:90% by weight.

9. A process for preparing the dye mixture as claimed in claim 1, which comprises mixing the dyes of the general formulae (1) and (2)

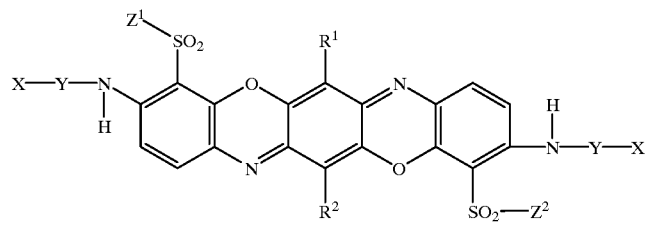

(1)

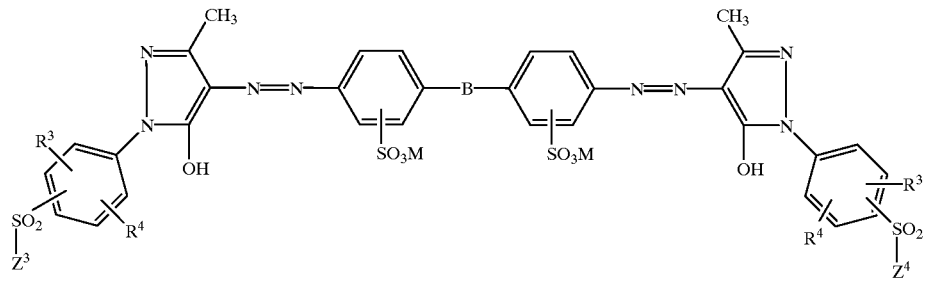

(2)

wherein $R^1$–$R^4$, $Z^1$–$Z^4$, X, Y, B and M are defined in claim 1.

10. A process of dyeing a hyrdoxyl or carboxamido or mixture of hydroxyl and carboxamido containing material which comprises contacting the dye mixture as claimed in claim 1 to said material.

11. The dye mixture as claimed in claim 2, wherein $R^3$ and $R^4$ are hydrogen and $Z^1$, $Z^2$, $Z^3$, and $Z^4$ are identical or different and are β-sulfatoethyl or vinyl and Y is —CH$_2$CH$_2$—.

12. The dye mixture as claimed in claim 11, wherein X is —OSO$_3$H.

13. The dye mixture as claimed in claim 11, wherein X is —NHCOCH$_2$CH$_2$COOH.

14. The dye mixture of claim 1 where $R^4$ is ethyl or methyl.

* * * * *

UNITED STATES PATENT AND TRADEMARK OFFICE
CERTIFICATE OF CORRECTION

PATENT NO.    : 6,358,287 B1  
DATED         : March 19, 2002  
INVENTOR(S)   : Ehrenberg et al Page 1 of 1

It is certified that error appears in the above-identified patent and that said Letters Patent is hereby corrected as shown below:

Column 13,
Line 4, after "then X" delete -- then X --.

Signed and Sealed this

Eighteenth Day of June, 2002

*Attest:*

*Attesting Officer*

JAMES E. ROGAN
*Director of the United States Patent and Trademark Office*